July 7, 1959 H. WEISS ET AL 2,894,234

ELECTRIC VARIABLE RESISTANCE DEVICES

Filed Nov. 19, 1954 2 Sheets-Sheet 1

2,894,234
Patented July 7, 1959

2,894,234

ELECTRIC VARIABLE RESISTANCE DEVICES

Herbert Weiss, Nurnberg, and Heinrich Welker, Erlangen, Germany, assignors to Siemens-Schuckertwerke Aktiengesellschaft, Berlin-Siemensstadt, Germany, a German corporation Application November 19, 1954, Serial No. 470,092
Claims priority, application Germany November 21, 1953
29 Claims. (Cl. 338—32)

Our invention relates to variable resistance devices utilizing the effects of a magnetic field upon the electrical characteristics of a semiconductor member. More specifically, the invention is directed particularly to such devices where the semiconductor member has a carrier mobility of about 6,000 cm.$^2$/v. sec. or more.

The invention has for its principal object to improve such devices so as to secure a much wider range of magnetically responsive resistance variation than heretofore obtainable.

To this end, and in accordance with a feature of our invention, we give the semiconductor member, exposed to a magnetic field, such a geometric shape and orientation as to make the course of the electric current flow in the semiconductor member dependent upon the strength of the magnetic field.

These and other objects and features of the invention will be apparent from the following description and the embodiments of the invention shown in the accompanying drawings wherein—

Figure 1:
Figs. 1 to 4 are explanatory and serve to illustrate the physical basis for the invention.
Figure 2:
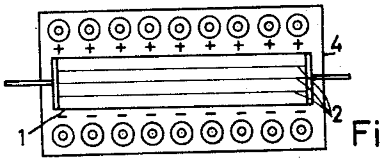

The physical basis for the invention will be apparent from the following considerations. If a rod-shaped conductor 1 in Fig. 1 is traversed by current flowing in its longitudinal direction, the current flow paths between the terminals or electrodes 3 will be as indicated at 2, i.e. the current flow will be such that the shortest path is from terminal to terminal, and the conductor, therefore, will present the least possible resistance. If the rod-shaped conductor 1 is subjected to the field of a magnet 4 with such an orientation that the direction of the magnetic field is perpendicular to the plane of illustration, as shown in Fig. 2 (wherein the magnetic field lines penetrating the plane of illustration are indicated by encircled dots), the course of the charge carriers will be deflected in a direction which is perpendicular to the current path lines and also perpendicular to the magnetic lines of force. This causes an electric charge to occur on the two outer surfaces of the conductor that are perpendicular to the direction in which the electric charge carriers are deflected. The positive (+) and negative (−) electric charges are indicated in Fig. 2. The electric field thus produced is called "Hall field," and the corresponding electrical voltage occurring across the semiconductor member is called "Hall voltage." Under static conditions, the Hall field is just large enough to compensate for the magnetic field strength exerted upon the charge carriers. For this reason, in a conductor or semiconductor member of the shape illustrated in Fig. 1, the current path lines 2 are the same with the magnetic field (Fig. 2) as without the magnetic field (Fig. 1). In spite of this, the resistance of the conductor or semiconductor is increased because of the magnetic field. This is due to the fact that under the influence of the magnetic field, the carrier mobility of the charge carriers, i.e. the mobility of the electrons or holes, is less than it would be without the magnetic field.

According to the invention, this resistance variation due to a magnetic field is greatly increased over that produced by the Hall effect alone, by shaping the semiconductor member and orienting it in the magnetic field in such a manner as to suppress the formation of the Hall field, so that a deflection of the current flow lines occurs. Such a device will now be described in connection with Figs. 3 and 4.

Figure 3:
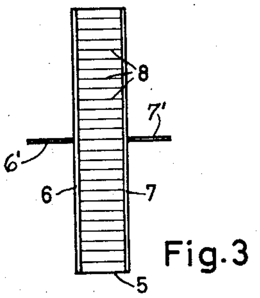
Figure 4:
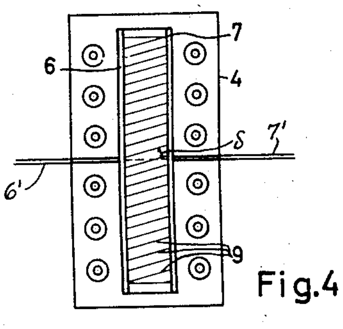

According to Figs. 3 and 4, a prismatic semiconductor member 5 is provided with two opposed surface terminals or electrodes 6 and 7 having leads 6′ and 7′. The dimension of the semiconductor member 5 perpendicular to the plane of illustration is not of importance with respect to the current deflection effect. It is important only that the distance between electrodes 6 and 7 is smaller than the length of the semiconductor member in the plane of illustration. It will therefore be understood that the term "length dimension" as employed herein refers to said dimension in the plane of the illustration, which dimension is transverse to the magnetic flux. The term "length dimension" does not necessarily signify that said dimension is the longest dimension of the prism. If an electric field is applied to the electrodes, the current follows the shortest path between the two electrodes, as illustrated by the flow lines 8 in Fig. 3. However, if a magnetic field is applied perpendicular to the plane of illustration (the points of penetration of which are indicated by encircled dots in Fig. 4), the Hall voltage, in contrast to the condition described in connection with Fig. 2, can no longer compensate for the magnetic force exterted upon the current paths. The current paths 9 under the influence of the magnetic field (Fig. 4) are, therefore, deflected by an angle $\delta$ (Hall angle) from the course obtaining without a magnetic field (Fig. 3). As a result, the current paths no longer represent the shortest distance between electrodes. Aside from the increase in resistance variation in a magnetic field due to the above-mentioned lengthening of the lines of current flow, there occurs an additional increase in resistance as a result of the diminution in distance between the flow lines. This corresponds to an increase in current density and hence in resistance. This crowding of the current flow lines is also to be considered as a magnetically responsive resistance variation in accordance with the invention.

With conductor and semiconductor members of small carrier mobility, the magnetic resistance variation, even when utilizing both above-mentioned effects, generally is too slight for practical application. Not so, however, with semiconductors whose carrier mobility is as high as about 6,000 cm.$^2$/v. sec. or about 10,000 cm.$^2$/v. sec. and more. With such materials, the displacement of the current paths under the influence of the magnetic field and the resistance variation resulting therefrom have appreciable and practically well applicable magnitudes. This will be explained presently.

For any given conditions of magnetic field strength, power supply in the electric circuit of the semiconductor, geometric shape and dimensions, and charge-carrier concentration, the magnetic effect upon the electrical characteristics increases with the carrier mobility of the particular semiconductor substance. Hence, if the resistance variation to be produced is to have a practically utilizable order of magnitude with magnetic field strength within the practically or economically realizable limits, the carrier mobility must have a correspondingly high value.

"Carrier mobility" is defined as the velocity of the electric charge carriers within the semiconductive substance in centimeters per second in an electric field of one volt per centimeter. One and the same semiconductor substance may exhibit (n-type) conductance by excess electrons or negative carriers, or (p-type) conductance by defect-electrons (holes) or positive carriers, depending upon the preparative treatment applied to the substance. The type of conductance depends particularly on the choice of small traces of substitutional impurities that are added to, or contained in, the substance and cause lattice defects, i.e. disturb the perfection of the valence-bond structure. The term "carrier mobility" or "mobility" as used herein is generic to both types of conductance, it being only essential that either the electron mobility or the hole mobility of the semiconductive compound be about 6,000 cm.$^2$/v. sec. or more. The reason why such a minimum of carrier mobility is required will be understood from the following.

When, in a semiconductor, an electron carrying an electric charge $e$ and having a carrier mobility $\mu$ is subjected to an electric field E as produced by the flow of current through the semiconductor, then the electron is subjected to the force $K_{el}=eE$. Under the effect of this force, the electron moves at a velocity $v=\mu E$. If this electron is also subjected to a magnetic field H directed perpendicularly to the electric field, then an additional force is imposed upon the electron perpendicularly to its original direction of motion. This additional force has the magnitude $$K_{magn}=evH=e\mu EH$$

The ratio of the two forces $K_{magn}/K_{el}$ is equal to $\mu$H. If the value $\mu$H is of a smaller order of magnitude than unity, the magnetic effect upon the electric properties of the semiconductor is slight and negligible. On the other hand, this effect is considerable if $$K_{magn}/K_{el}=\mu H\approx 1$$

that is, when the magnetic force is of the same order of magnitude as the electric force so that the value $\mu$H is approximately equal to unity.

Consequently, the value $\mu H=1$ may be taken as an approximate limit for the occurrence of appreciable magnetic effects. The magnetic field in the foregoing consideration is measured in volt second/cm.$^2$ and the mobility in cm.$^2$/v. sec.

Now, the magnetic field strengths readily obtainable with electromagnets are up to about 17,000 Gauss while, because of the saturation properties of iron, field strengths larger than 17,000 Gauss can be produced only with difficulty or at an unproportionately large expenditure. It follows that for securing magnetic effects of utilizable magnitude, the semiconductor must have a minimum mobility of about 6,000 cm.$^2$/v. sec., because 17,000 Gauss is equal to 1.7.10$^{-4}$ volt second/cm.$^2$, so that $$\mu H=6{,}000\times 1.7\times 10^{-4}\approx 1$$

The maximum field strength obtainable with the available permanent magnets is approximately 10,000 Gauss. It follows that, when providing a device according to the invention with a permanent-magnet field, a minimum carrier mobility of about 10,000 cm.$^2$/v. sec. is required, because 10,000 Gauss is equal to $10^{-4}$ volt second/cm.$^2$ so that $$\mu H=10{,}000\times 10^{-4}=1$$

It will be recognized that in view of the technically well applicable magnetic field strengths, a minimum carrier mobility of about 6,000 or preferably 10,000 cm.$^2$/v. sec. is needed.

The elementary semiconductor substances heretofore used for transistors, namely silicon and germanium, do not have such a high carrier mobility, the best obtainable mobility, namely that of germanium, being about 3,000 cm.$^2$/v. sec. However, the required high carrier mobilities are available with semiconductive compounds.

A compound, in contrast to a homopolar element, has, aside from its homopolar component, also a heteropolar component due to the chemical difference in the lattice elements. The superposition of homopolar and heteropolar components results in an increase in bonding energy due to the so-called resonance strengthening. This has a favorable effect upon the carrier mobility in all those cases in which the heteropolar component of a compound is so weak that its detrimental influence upon the electron mobility is not yet noticeable while at the same time the strengthening of the bond by the resonance between the homopolar and heteropolar components is appreciable.

The foregoing applies especially to binary compounds of the type $A_{III}B_V$, that is to compounds of an element of the third group in the periodic system with an element of the fifth group. Such compounds are described in the copending application of H. Welker for Semiconductor Devices and Methods of Their Manufacture, Serial No. 275,785, filed March 10, 1952, now Patent No. 2,798,989, and assigned to the assignee of the present invention. The compounds of the $A_{III}B_V$ type comprise those of an element selected from boron, aluminum, gallium and indium with an element selected from nitrogen, phosphorus, arsenic and antimony. Examples of such compounds are AlN, AlP, AlAs, AlSb, GaN, GaP, GaAs, GaSb, InP, InAs, InSb, BP. The semiconductor bodies made of these compounds may contain extremely slight traces of substitutional impurities. As a rule, for instance, a trace of tellurium or selenium produces n-type conductance, and a trace of cadmium, zinc or magnesium produces p-type conductance in $A_{III}B_V$ compounds. Especially notable among these compounds are InSb and InAs, both having carrier mobilities above 20,000 cm.$^2$/v. sec. The preparation, stoichiometric nature, and carrier mobilities of such compounds are described in the following prior literature:

Pearson and Tannenbaum, The Physical Review (U.S.A.) page 153, April 1, 1953, describing preparation of InSb;

H. Weiss, Zeitschrift für Naturforschung, pp. 463–469 August 1953;

H. Welker, Zeitschrift für Naturforschung, pp. 248–251, April 1953, and pp. 744–749, of 1952;

Gremmelmaier et al., Zeitschrift für Naturforschung, page 333, May 1953.

Figure 5:
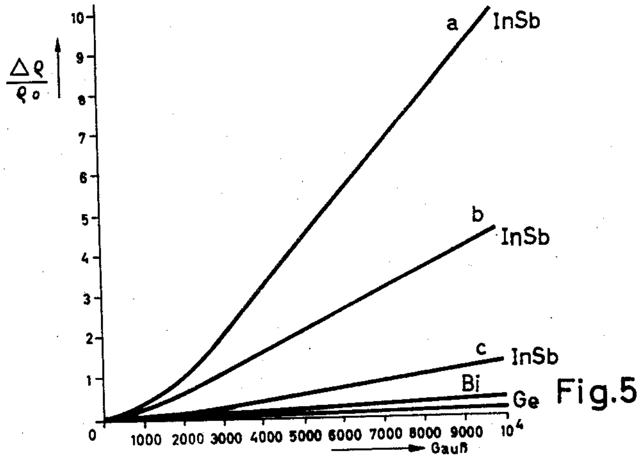
Fig. 5 is a coordinate diagram showing resistance variation in semiconductors versus magnetic field strength.

The increase in magnetically controlled resistance variation obtainable by virtue of the invention with semiconductors of high carrier mobility is apparent from the comparative examples of curves presented in the coordinate diagram of Fig. 5 showing resistance variation $$\left(\frac{\Delta\rho}{\rho_0}\right)$$

versus magnetic field strength in Gauss.

In Fig. 5, the measured resistance variations in a magnetic field of up to 10,000 Gauss are shown for bismuth (Bi), germanium (Ge) and indium antimonide (InSb), with respect to the last of which three different curves representing different geometric sizes and positions in the magnetic field are shown. Curve ($a$) relates to a semiconductor member of the size 10×3×0.5 mm. designed and oriented in a magnetic field according to Fig. 4. Curve ($b$) corresponds to a square plate (8×8×0.5 mm.) also in a device according to Fig. 4. Curve ($c$) corresponds to a rod-shaped semiconductor member in a device according to Fig. 2.

Figure 6:
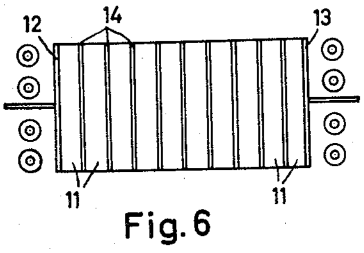
Fig. 6 is an embodiment of the invention comprising a pile of semiconductor members.

The device, according to Fig. 4 has a small ohmic resistance, especially when using low-resistance semiconductor materials such as indium antimonide (InSb), which may be undesirable for some applications. This low resistance can be overcome by piling a plurality of such crystals together in a series arrangement as illustrated in Fig. 6. In Fig. 6 a number of semiconductor plates 11 are joined together to form a single unit with metal terminals 12, 13 and intermediate terminal layers or foils 14 also of metal. The pile is arranged in a magnetic field as shown in Fig. 2.

Figure 7:
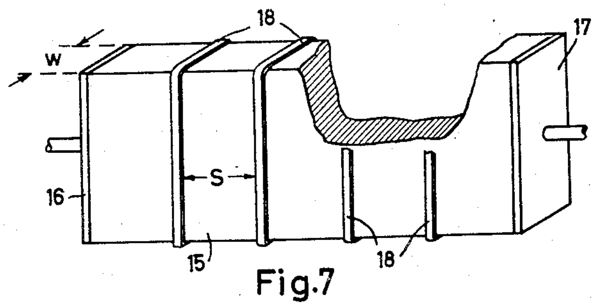
Fig. 7 shows in perspective a modified form of a device similar in effect to that of Fig. 6.

A similar resistance-increasing effect is produced by providing a single elongated semiconductor body 15, as shown in Fig. 7, with terminals 16, 17 at the two small sides and placing a number of metal strips 18 parallel to the electrodes onto the surface of the body. The strips may be produced by soldering thin wires to the body, or by painting a vaporizing metal onto the surface with the aid of a stencil. The spacing S between the strips must be larger than the width W of the body 15.

Figure 8:
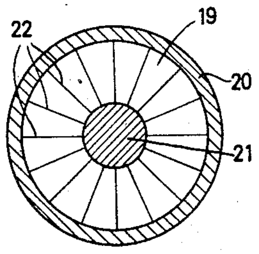
Figs. 8 and 9 are top views of another embodiment of the invention comprising a disc-shaped element.
Figure 9:
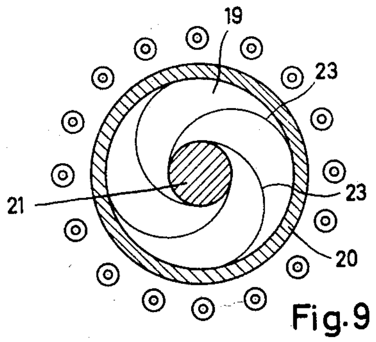

With use of the arrangement according to Fig. 4, there exists the possibility of marginal distortions due to the fact that in the vicinity of the bare surfaces of the semiconductor the current flow lines, also in the magnetic field, must run approximately parallel to the surfaces. Such marginal disturbances are inhibited in a device of the type exemplified in Fig. 8. The semiconductor member has the shape of a disc 19 which is circumferentially surrounded by an annular electrode 20. The second electrode 21 is applied to the middle of the disc (Corbino disc). A circular shape of the disc is preferable though not absolutely necessary. Due to the elimination of edged distortions, the resistance variation in the magnetic field is especially great when using this arrangement. The paths of current flow without a magnetic field are illustrated in Fig. 8 at 22, and those under influence of a magnetic field are shown in Fig. 9 at 23.

In order to produce a high total resistance, the inner electrode is preferably applied as a point contact. A point contact is defined as one wherein the radius of the outer electrode has a ratio of at least 10 to 1 with respect to the radius of the inner electrode. The resistance R of such a device is given by the equation:

$$R=\frac{\rho}{2\pi d}\ln R_1/R_2$$

wherein $\rho$ is the specific resistance of the semiconductor crystal, $d$ its thickness, $R_1$ the radius of the outer electrode, and $R_2$ the radius of the inner electrode.

Figure 10:
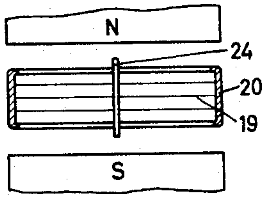
Figs. 10 and 11 are lateral views of modified forms of the embodiment shown in Fig. 8.
Figure 11:
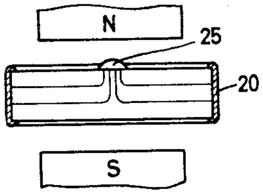

The point contact is preferably produced as follows. The crystal 19 is provided with a small bore, and a metal wire 24 extending through the crystal is soldered in place (Fig. 10). This design, as compared with a surface contact 25 as illustrated in Fig. 11, has the advantage that the lines of current flow are perpendicular to the magnetic field throughout the entire current path including the immediate vicinity of the point contact, thus producing the maximum magnetic resistance variation. It is also possible, instead of using a circumferential outer electrode, to use a second point electrode of the kind shown in Fig. 11 or to use several pairs of point electrodes.

Aside from the increase in magnetically responsive resistance variation, the devices according to the invention have the advantage of a relatively high current carrying capacity. The outer parts of the semiconductor crystal present relatively large cooling surfaces and thus contribute to dissipating heat generated in the vicinity of the point contact.

With respect to devices of the type shown in Figs. 8 to 11, it is not necessary that the whole crystal be located in the magnetic field but suffices to place into the field only the area surrounding the point contact, since this area contributes the major share of resistance variation (see Fig. 11). This has the advantage that small magnetic pole shoes can be used. For this reason, it is also possible to substitute in the disc-shaped semiconductor member the outer portion, which contributes little to the desired effect, by sheet metal parts to serve as cooling fins. The size of the fins can be chosen in accordance with the amount of heat dissipation desired.

Figures 12, 13:
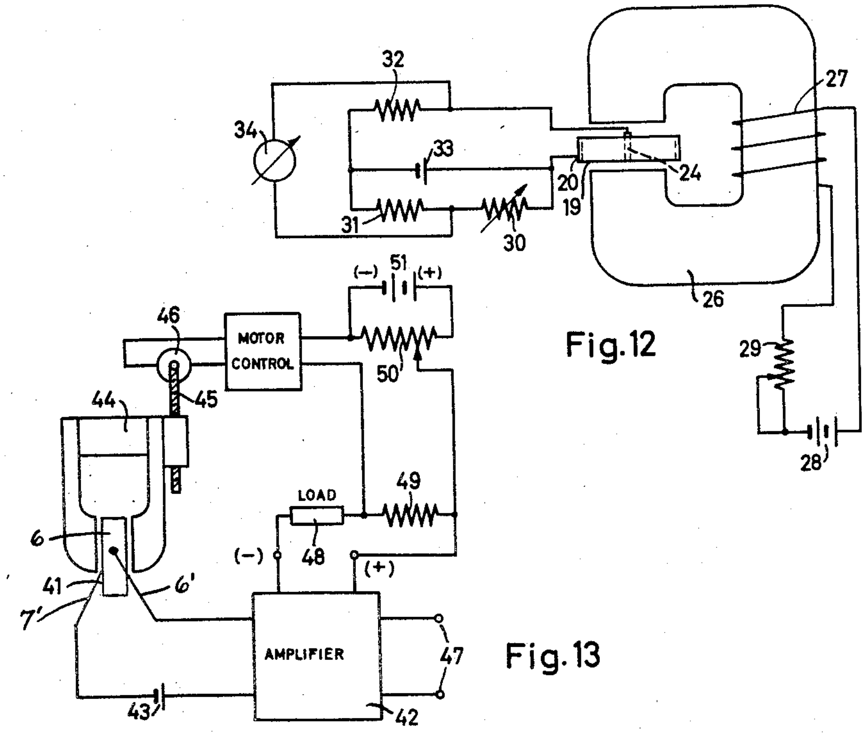
Fig. 12 shows a circuit diagram of apparatus for measuring resistance variation in a device according to the invention.
Fig. 13 is a control system equipped with a device according to the invention.

Fig. 12 illustrates a complete apparatus equipped with a cylindrical disc device according to the invention for the measurement of a variable magnetic field. In the illustrated circuit, an electromagnet 26 has an energizing winding 27 connected to a direct-current source 28 in series with a rheostat 29 by means of which magnetic field strength in the magnet gap can be varied. Placed within the gap is a cylindrical disc 19 of semiconductor substance having high carrier mobility. The disc 19 is provided with an outer cylindrical electrode 20 and a central wire electrode 24. The electrodes of the semiconductor member are connected as one leg of a Wheatstone bridge circuit comprising resistors 30, 31 and 32, a current-supply diagonal with a direct-current source 33, and a measuring diagonal containing a null-indicating instrument 34. Field strength for various settings of the rheostat 29 can be measured in the Wheatstone bridge by achieving balance and reading the bridge resistance values, as is well known in the art.

The embodiment of Fig. 13 exemplifies the provision of a permanent magnet for producing the magnetic field in the semiconductor device and shows one of the available possibilities of feed-back control. The semiconductor device comprises a member 41 designed and disposed according to Fig. 3 or Fig. 6 and is connected in the input circuit of an amplifier in series with a current source 43 of constant voltage. The semiconductor member is disposed within the magnetic field between the pole shoes of a permanent magnet 44 which can be displaced relative to member 41 by means of a spindle 45 driven from a reversible motor 46. The resultant voltage applied to the amplifier 42 thus depends upon resistance of member 41 and hence upon the relative position of member 41 and magnet 44. The amplifier is supplied with power through line terminals 47 and energizes a load 48. A resistor 49 in the load circuit provides a voltage drop proportional to the load current. This voltage drop is compared with a reference voltage taken from across the tapped-off portion of a rheostat 50 energized from a current source 51. The resultant differential voltage is applied through suitable motor control means to cause the motor 46 to run in one or the other direction when the load-responsive voltage across resistor 49 departs in one or the other sense from the reference voltage. This system operates to regulate the load current in accordance with a desired constant value determined by the setting of the rheostat 50, and it will be understood that it may also be used for positional control of movable structure.

It will be apparent that the control may also be effected by changing the angular position or field and semiconductor relative to each other. Furthermore, instead of displacing the magnet structure, it may be kept fixed while the semiconductor is moved accordingly.

It will be recognized from the embodiments described in the foregoing that a semiconductor device according to the invention may be controlled by several variable input magnitudes. For instance, one control magnitude can be applied by varying the current intensity in the electric circuit of the semiconductor members. A second control magnitude can be applied by varying the strength of the magnetic field. A third control magnitude can be made effective by varying the position of the semiconductor relative to the effective field zone of the magnet; and if a fourth control magnitude is to be effective, it may act to vary the relative angular orientation of semiconductor group and magnetic field. If a lesser number of controlling magnitudes is to be effective, then any desired smaller number of the above-mentioned four control possibilities may be chosen, depending upon the requirements of the particular application.

If desired, the Hall voltage generated by the semiconductor member in a device according to the invention may also be used for controlling an electric circuit. For instance, the Hall voltage may be directly or indirectly introduced into the same control circuit that utilizes the change in magnetically responsive resistance, thus combining the effects of resistance variation and Hall voltage within a single measuring or control circuit.

As will be recognized from the embodiment shown in Fig. 13, the position of the semiconductor member can be made adjustable with respect to the magnetic field. This can be used for setting the semiconductor member, by means of a positioning screw or the like, to the particular position that is needed for selecting a resistance characteristic (see Fig. 5) best suited for the particular application.

It will be understood by those skilled in the art that the invention permits of various embodiments, modifications and uses other than those herein specifically described without departing from the essential features of the invention as set forth in the claims annexed hereto.

We claim:

1. A variable-resistance device, comprising magnet means having a magnetic field, a resistance member consisting of an integral disc of semiconductor substance having a minimum carrier mobility of about 6000 $cm.^2$/volt second, said disc being disposed in said field and having opposite faces extending in a direction transverse to that of said field, and two terminals joined with said disc and spaced from each other in said transverse direction a distance smaller than the diameter of said disc.

2. A semiconductor device utilizing magnetic field strength for effecting resistance change in the semiconductor, comprising magnetic means having a magnetic field, a semiconductor member having a minimum carrier mobility of about 6000 $cm.^2$/volt second and having substantially the shape of a cylindrical disc, a pair of terminals joined with said disc, one of said terminals surrounding the periphery of said disc, said other terminal being located centrally of said disc, said member being disposed in said field and having opposite faces extending transversely to the direction of said field.

3. A semiconductor device utilizing magnetic field strength for effecting resistance change in the semiconductor, comprising magnetic means having a magnetic field, a semiconductor member substantially in the shape of a cylindrical disc having a minimum carrier mobility of about 6000 $cm.^2$/volt second, a pair of terminals joined with said disc, one of said terminals surrounding the periphery of said disc, said other terminal being wire-shaped and extending centrally through said disc, said disc being disposed in said field and having opposite faces extending transversely to the direction of said field.

4. A semiconductor device utilizing magnetic field strength for effecting resistance change in the semiconductor, comprising magnetic means having a magnetic field, a semiconductor member substantially in the shape of a cylindrical disc having a minimum carrier mobility of about 6000 $cm.^2$/volt second, a pair of terminals joined with said disc, one of said terminals surrounding the periphery of said disc, said other terminal comprising a point electrode mounted centrally on the surface of said disc, said disc being disposed in said field and having opposite faces extending transversely to the direction of said field.

5. A variable-resistance device, comprising magnet means providing a magnetic field, a resistance member comprising a semiconductor material ordinarily subject to formation of a Hall voltage when mutually transverse electric and magnetic fields are present therein and having a minimum carrier mobility of about 6000 $cm.^2$/volt second, two current conductor elements joined with said member at respective places spaced from each other in a direction transverse to that of said magnetic field, one of said elements extending over an area of said member, said one element having one of its dimensions extending transversely to said field, the spacing between the two conductor elements being less than the said dimension, whereby the formation of the Hall field is minimized.

6. A variable-resistance device, comprising magnet means having a magnetic field, a resistance member consisting of semiconductor substance having a minimum carrier mobility of about 6000 $cm.^2$/volt second, two current supply terminals joined with said member at respective places spaced from each other in a direction transverse to that of said field, the spacing between said two terminals being smaller than a certain dimension of said member, said member being disposed in said field with said dimension transverse to said field, whereby the formation of the Hall field is minimized, the substance being a binary compound of the formula $A_{III}B_V$.

7. A variable-resistance device, comprising magnet means having a magnetic field, a resistance member consisting of a disc of semiconductor substance having a minimum carrier mobility of about 6000 $cm.^2$/volt second, said disc being disposed in said field and having opposite faces extending in a direction transverse to that of said field, and two terminals joined with said disc and spaced from each other in said transverse direction a distance smaller than the diameter of said disc, the substance being a binary compound of the formula $A_{III}B_V$.

8. A variable-resistance device, comprising magnet means having a magnetic field, a resistance member consisting of semiconductor substance having a minimum carrier mobility of about 6000 $cm.^2$/volt second, two current supply terminals joined with said member at respective places spaced from each other in a direction transverse to that of said field, the spacing between said two terminals being smaller than a certain dimension of said member, said member being disposed in said field with said dimension transverse to said field, whereby the formation of the Hall field is minimized, said substance being the binary compound InAs.

9. A variable-resistance device, comprising magnet means having a magnetic field, a resistance member consisting of semiconductor substance having a minimum carrier mobility of about 6000 $cm.^2$/volt second, two current supply terminals joined with said member at respective places spaced from each other in a direction transverse to that of said field, the spacing between said two terminals being smaller than a certain dimension of said member, said member being disposed in said field with said dimension transverse to said field, whereby the formation of the Hall field is minimized, said substance being the binary compound InSb.

10. A variable-resistance device, comprising magnet means providing a magnetic field, a resistance plate comprising a semiconductor having a minimum carrier mobility of about 6000 $cm.^2$/volt second taken from the group consisting of InSb and InAs, two opposite current conductor plates joined with said member at respective places spaced from each other in a direction transverse to that of said magnetic field, the plate having a certain dimension extending transversely to said magnetic field, the spacing between the conductor plates being less than said dimension, whereby the formation of the Hall field is minimized.

11. The device described in claim 10 in which the semiconductor is InAs.

12. A variable-resistance device, comprising magnet means providing a magnetic field, a flat resistance member comprising a semiconductor material having a minimum carrier mobility of about 6000 $cm.^2$/volt second, said semiconductor material being a binary $A_{III}B_V$ semiconductor compound, two current conductor elements joined with said member at respective places spaced from each other in a direction transverse to that of said magnetic field, one of said elements extending over an area of said member, said one element having a dimension extending transversely to said field, the spacing between the two conductor elements being less than the said dimension, whereby the formation of the Hall field is minimized.

13. A variable-resistance device, comprising magnet means providing a magnetic field, a resistance member comprising a semiconductor material having a minimum carrier mobility of about 6000 cm.$^2$/volt second, said semiconductor material being InSb, two current conductor elements joined with said member at respective places spaced from each other in a direction transverse to that of said magnetic field, one of said elements extending over an area of said member, said one element having a dimension extending transversely to said field, the spacing between the two conductor elements being less than the said dimension, whereby the formation of the Hall field is minimized.

14. A variable-resistance device, comprising magnet means providing a magnetic field, a resistance member comprising a semiconductor material having a minimum carrier mobility of about 6000 cm.$^2$/volt second, said semiconductor being InAs, two current conductor elements joined with said member at respective places spaced from each other in a direction transverse to that of said magnetic field, one of said elements extending over an area of said member, said one element having a dimension extending transversely to said field, the spacing between the two conductor elements being less than the said dimension, whereby the formation of the Hall field is minimized.

15. A semiconductor device utilizing magnetic field strength for effecting resistance change in a semiconductor, magnet means having a magnetic field, a pile formed of a plurality of resistance plates consisting of semiconductor substance having a minimum carrier mobility of about 6000 cm.$^2$/volt second, said semiconductor being InAs, said pile having opposite contact terminals, conductive elements disposed intermediate said individual plates, said pile being positioned in said magnetic field, said terminals and conductive elements providing surfaces extending longitudinally to the direction of said field, and said conductive elements and terminals being spaced from each other in a direction transverse to said field, the transverse spacing being less than a certain length dimension of the plates, said plates being disposed in said field with said length dimension transverse to said field.

16. The apparatus defined in claim 2, the semi-conductor member comprising an $A_{III}B_V$ binary semiconductor compound.

17. The apparatus defined in claim 3, the semiconductor member comprising an $A_{III}B_V$ binary semiconductor compound.

18. The apparatus defined in claim 4, the semiconductor member comprising an $A_{III}B_V$ binary semiconductor compound.

19. A variable-resistance device, comprising magnet means having a magnetic field, a resistance member formed of an integral body of semiconductor substance having an original minimum carrier mobility of about 6000 cm.$^2$/volt second being normally subject to formation of a Hall effect voltage, two current supply terminals joined with said body at respective places fixedly spaced from each other in a direction transverse to that of said field, the spacing between said two terminals being smaller than a certain dimension of said member, said member being disposed in said field with said dimension transverse to said field, whereby the formation of the Hall field is minimized.

20. A variable-resistance device, comprising magnet means having a magnetic field, a resistance member formed of an integral body of semiconductor substance having an original minimum carrier mobility of about 6000 cm.$^2$/volt second and being normally subject to formation of a Hall effect voltage, two current supply terminals joined with said body at respective places fixedly spaced from each other in a direction transverse to that of said field, the spacing between said two terminals being smaller than a certain dimension of said member, said member being disposed in said field with said dimension transverse to said field, whereby the formation of the Hall field is minimized, said body having the shape of a flat plate, said two terminals being disposed on the two opposite large surfaces of said plate, said surfaces extending substantially parallel to the direction of said magnetic field, said dimension and said direction of spacing of the two terminals being normal to each other.

21. A variable-resistance device, comprising magnet means having a magnetic field, a resistance member of semiconductor substance disposed in said field, and having a minimum carrier mobility of about 6000 cm.$^2$/volt second, two current supply terminals joined with said member at opposite sides thereof spaced from each other in a direction transverse to that of said field, a plurality of strip elements of metal disposed on the surface of said member between said terminals, said strip elements extending each in a plane parallel to and spaced from said terminals, the spacing between the respective strip elements and between said strip elements and said terminals being less than a certain dimension of the member, said member being disposed in said field with said dimension transverse to said field.

22. A variable-resistance device, comprising magnet means having a magnetic field, a resistance member formed of semiconductor substance ordinarily subject to formation of a Hall voltage when mutually transverse electric and magnetic fields are present therein and having a minimum carrier mobility of about 6000 cm.$^2$/volt second, two current supply terminals joined with said member at respective places fixedly spaced from each other in a direction transverse to that of said field, the spacing between said two terminals being smaller than a certain dimension of said member, said member being disposed in said field with said dimension transverse to said field, whereby the formation of the Hall field is minimized, and control means connected with said magnet means for varying the strength of said field to thereby vary the electric resistance of said member between said terminals.

23. A variable-resistance device, comprising magnet means having a magnetic field, a resistance member consisting of semiconductor substance ordinarily subject to formation of a Hall voltage when mutually transverse electric and magnetic fields are present therein and having a minimum carrier mobility of about 6000 cm.$^2$/volt second, two current supply terminals joined with said member at respective places spaced from each other in a direction transverse to that of said field, the spacing between said two terminals being smaller than a certain dimension of said member, said member being disposed in said field with said dimension transverses to said field, whereby the formation of the Hall field is minimized, and control means for varying the relative position of said member and magnet-field means whereby the electric resistance of said member between said terminals is varied in dependence upon said control means.

24. A semiconductor device utilizing magnetic field strength for effecting resistance change in a semiconductor, magnet means having a magnetic field, a pile formed of a plurality of resistance plates consisting of semiconductor substance ordinarily subject to formation of a Hall voltage when mutually transverse electric and magnetic fields are present therein and having a minimum carrier mobility of about 6000 cm.$^2$/volt second, said pile having opposite contact terminals, conductive elements disposed intermediate said individual plates, said pile being positioned in said magnetic field, said terminals and conductive elements providing surfaces extending longitudinally to the direction of said field, and said conductive elements and terminals being spaced from each other in a direction transverse to said field, the transverse spacing being less than a certain dimension of the plates, said plates being disposed in said field with said dimension of the respective plates coextending transversely to said field.

25. The apparatus defined in claim 24, the semiconductor member being formed of the binary compound, InSb.

26. The apparatus defined in claim 2, the semiconductor member being formed of the binary compound, InSb.

27. The apparatus defined in claim 21, the semiconductor member comprising an $A_{III}B_{V}$ binary semiconductor compound.

28. The apparatus defined in claim 22, the semiconductor member comprising an $A_{III}B_{V}$ binary semiconductor compound.

29. The apparatus defined in claim 23, the semiconductor member comprising an $A_{III}B_{V}$ binary semiconductor compound.

References Cited in the file of this patent

UNITED STATES PATENTS

| | | |
|---|---|---|
| 2,599,550 | Fraser | June 10, 1952 |
| 2,616,074 | McCreary | Oct. 28, 1952 |
| 2,752,434 | Dunlap | June 26, 1956 |

FOREIGN PATENTS

| | | |
|---|---|---|
| 261,748 | Switzerland | Sept. 28, 1944 |